United States Patent Office 3,074,961
Patented Jan. 22, 1963

3,074,961
CERTAIN NEW NORBORNENES
George I. Poos, Ambler, Pa., assignor to McNeil Laboratories, Incorporated, a corporation of Pennsylvania
No Drawing. Filed Aug. 11, 1960, Ser. No. 48,829
4 Claims. (Cl. 260—326.3)

This invention relates to a new series of organic compounds. More particularly, the invention relates to novel norbornenes, the corresponding norbornanes, and methods for their preparation. Also included within the scope of this invention are the corresponding therapeutically active acid addition salts and quaternary ammonium compounds.

The compounds of this invention may be defined by the following general general structural formula:

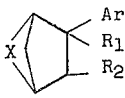

wherein:

X=ethylene, vinylene.
Ar=phenyl or substituted phenyl, i.e., wherein the phenyl ring includes one or more additional substituents such as lower alkyl, lower alkoxy, halo or amino.
$R_1$=$CO_2H$, $CO_2R_3$ and $CH_2OH$ wherein $R_3$ is lower alkyl.
$R_2$=$COR_4$, $CH_2R_4$ wherein $R_4$ is N,N-di-lower hydrocarbonamino, the lower hydrocarbon function being a saturated or unsaturated, cyclic, straight or branched-chain alkyl group; or an N,N-lower alkylene amino group, the alkylene chain of which contains from 4 to 6 carbon atoms, which are in the form of a straight carbon chain or interrupted by one or more hetero atoms such as oxygen, sulfur or nitrogen, thus forming a lower oxa-, thia- or aza-alkylene radical and which, when taken together with the nitrogen atom may form, for example, a piperidino, pyrrolidino, hexamethyleneimino, morpholino, thiamorpholino or piperazino radical.

As used herein "lower alkyl" means a chain from 1 to 7 carbon atoms, e.g., methyl, ethyl, propyl, isopropyl, butyl, isobutyl, pentyl, isopentyl, etc.; "lower alkoxy" means for example, methoxy, ethoxy, propoxy, butoxy, pentoxy, etc.; "halo" mean chloro, fluoro, bromo and iodo.

Acid addition salts of the compounds of this invention are those obtainable by reaction with organic or inorganic acids and yielding therapeutically active compounds as for example hydrohalic acids such as hydrochloric, hydrobromic, or hydriodic acid; sulfuric, nitric, phosphoric, acetic, propionic, glycolic, lactic, pyruvic, oxalic, malonic, succinic, maleic, fumaric, malic, tartaric, citric, benzoic, cinnamic, mandelic, methane-sulfonic, ethane-sulfonic, salicylic, p-aminosalicylic, 2-phenoxy-benzoic and 2-acetoxy-benzoic acid.

Quaternary ammonium compounds of this invention having the above general formula are lower alko halides such as methiodides, ethobromides, or propochlorides; lower alkeno halides such as allyl bromides; lower alko sulfates such as metho sulfates or etho sulfates, and the corresponding hydroxides.

The substituent groups on the claimed norbornene (ane) nuclei may be spatially related in what is known as "exo" or "endo" positions in three-dimensional representation. It is to be understood, however, that the novel compounds, as generically described and claimed, are intended to embrace both of these configurations. The specific illustrations given are not to be considered as limitations upon the scope of the invention or as restrictive exemplifications of "exo" or "endo" configurations of a given compound.

The novel compounds are useful as central nervous system stimulants, mood elevators and antidepressants at a dose level corresponding to one-tenth the toxic dose. At low doses, they are capable of antagonizing the effects of 5-hydroxytryptamine (serotonin).

The novel compounds may be prepared by reacting the appropriately substituted norbornene-2,3-dicarboxylic acid anhydride (or the corresponding norbornane) with an appropriate secondary amine in the presence of a strong base. The resulting acid amide may be reduced to the amino alcohol or to the amino acid and the latter esterified.

Secondary amines suitable for reaction with the acid anhydride are symmetrical or unsymmetrical and include: dimethylamine, diethylamine, dipropylamine, diallylamine, methylethylamine, dibenzylamine, diphenylamine, pyrrolidine, morpholine, piperidine, methylaniline.

As strong bases there may be used alkaline compounds such as hydroxides, alcoholates, hydrides, amides, or hydrocarbon compounds of alkali metals or alkaline earth metals, for example those of sodium or potassium or strong organic bases such as quaternary ammonium hydroxides or alcoholates. The formation of an alkali metal amide in situ through the corresponding hydride is preferred.

Splitting of the anhydride ring is advantageously conducted at room temperature in the presence of an excess of the secondary amine.

Conversion of the acid amide to the amino alcohol is accomplished by reduction with a di-light metal hydride such as sodium aluminum hydride or, preferably, lithium aluminum hydride. Alternatively, the reduction may be carried out with catalytically activated hydrogen; hydrogen in statu nascendi or with sodium or aluminum amalgam. As reaction solvents, there may be employed hydrocarbon solvents, halogenated hydrocarbons, ethers, etc., as for example, benzene, toluene, xylene, hexane, heptane, chloroform, carbon tetrachloride, chlorobenzene, diethylether, dioxane, diethylene glycol, dimethylether or, preferably, tetrahydrofuran.

If desired, the acid amide may be selectively reduced to the amino acid by means of an appropriate reducing agent such as one of those mentioned above, preferably a hydride. The acid in turn may be reacted with an appropriate alcohol to give the desired ester.

It will be understood that the norbornane series of novel compounds may be prepared either by employing the unsaturated acid anhydride as the starting material and proceeding through the necessary conversions to the desired end product or, alternatively, by starting with the unsaturated acid anhydride and hydrogenating either one of the intermediates or the final product, as desired. The hydrogenation is done by treating the unsaturated compound with hydrogen in the presence of a catalyst selected from the metals of the eighth group of the periodic system such as nickel, palladium, platinum, ruthenium or rhodium, which may be supported on a carrier such as barium carbonate or charcoal. Reduction of this nature is conducted in the presence of a solvent such as a lower alkanol for example, methanol or ethanol.

Depending upon the conditions employed during the course of the reaction, the novel compounds are obtained either in the form of the free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid.

The novel compounds may be converted into the corresponding quaternary ammonium compounds by reaction of the tertiary bases with alkylating agents, i.e., alkyl or aralkyl halides or esters formed by reacting alkanols with an oxygen-containing acid such as methyl iodide, ethyl bromide, propyl chloride; lower alkenyl halides—allyl bromide; di-lower alkyl—sulfates—dimethyl sulfate, diethyl sulfate; lower alkyl arylsulfonates—methyl p-toluolsulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are lower alkanols such as ethanol, propanol, or butanol; or organic acid amides such as formamide or dimethylformamide. When lower alkyl halogenides are used as quaternizing agents, formamide and dimethylformamide are the preferred solvents and the reaction is advantageously run in a closed vessel under pressure, the latter being built up by heating.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono-lower alkyl sulfate such as methyl sulfate or ethyl sulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The following examples are intended to illustrate, but not to limit, the scope of the present invention.

Example I

Thirty-five parts by volume of pyrrolidine is reacted with 3.75 parts by weight of 53% sodium hydride-mineral oil. The suspension is stirred for one hour at room temperature. A total of 6.50 parts by weight of exo-2-phenyl-endo-5-norbornene-2,3-dicarboxylic acid anhydride is added in portions. The suspension is stirred for one hour and allowed to stand overnight at room temperature. The pyrrolidine is removed under reduced pressure and the residue is dissolved in water. On acidification, a white solid precipitates, which does not dissolve when ether is added. The solid is collected by filtration, washed with water and ether, and air-dried. The crude solid, exo-2-phenyl-endo-3-pyrrolidinecarbonyl-5-norbornene-endo-2-carboxylic acid, melting point 150–151° C., is recrystallized from methylene chloride-ether, melting point 150–151.5° C.

Example II

A suspension of 7.5 parts by weight of lithium aluminum hydride in 250 parts by volume of dry tetrahydrofuran is stirred at room temperature for two hours and then is heated to reflux and a solution of 15.09 parts by weight of exo-2-phenyl-endo-3-pyrrolidinecarbonyl-5-norbornene-endo-2-carboxylic acid in hot tetrahydrofuran is rapidly added. The mixture is heated under reflux for sixty-six hours. While stirring, the mixture is cooled and carefully decomposed with 22.5 parts by volume of water. After stirring for two hours, the inorganics are removed by filtration and washed with ether. Concentration of the ethereal filtrate gives 12.97 parts by weight of 1-(endo-2-hydroxymethyl-exo-2-phenyl-5-norbornene-3-ylmethyl)pyrrolidine.

The hydrogen fumarate is prepared from 1.59 parts by weight of 1-(endo-2-hydroxymethyl-exo-2-phenyl-5-norbornene-3-ylmethyl)pyrrolidine and 0.66 part by weight of fumaric acid in isopropyl alcohol. The 1.51 parts by weight, melting point 197–200° C. (67%), is recrystallized from methanol-isopropyl alcohol to give 1.33 parts by weight of fumarate, melting point 203–205° C.

What is claimed is:

1. The compound 2-phenyl-3-pyrrolidinecarbonyl-5-norbornene-2-carboxylic acid.

2. The compound 1-(2-hydroxymethyl-2-phenyl-5-norbornene-3-ylmethyl)pyrrolidine.

3. The fumarate of the compound of claim 2.

4. A compound of the group consisting of those having the formula:

wherein X is a member of the group consisting of ethylene and vinylene, Ar is phenyl, $R_1$ is a member of the group consisting of carboxyl and hydroxymethyl, $R_2$ is a member of the group consisting of pyrrolidylcarbonyl and pyrrolidylmethyl, the therapeutically active acid addition salts and quaternary ammonium compounds thereof selected from the group consisting of lower alkyl halides, lower alkenyl halides, lower alkyl sulfates and the corresponding hydroxides.

References Cited in the file of this patent

UNITED STATES PATENTS 2,643,258    Miller et al. _____ June 23, 1953

OTHER REFERENCES

Wagner Zook: Synthetic Organic Chemistry, p. 480 (1953), New York, John Wiley and Sons, Inc.

Gaylor: "Reduction With Complex Metal Hydrides," pp. 322, 544 (1956), Interscience Publishers Inc., New York.